F. E. WILLIAMS.
PLAYING CARDS.
APPLICATION FILED MAR. 17, 1915.

1,204,834.

Patented Nov. 14, 1916.
4 SHEETS—SHEET 1.

Witnesses:

Inventor:
Frank E. Williams.
By *(signature)*
Attorney

F. E. WILLIAMS.
PLAYING CARDS.
APPLICATION FILED MAR. 17, 1915.

1,204,834.

Patented Nov. 14, 1916.
4 SHEETS—SHEET 2.

Witnesses:

Inventor:
Frank E. Williams.
By
Attorney

F. E. WILLIAMS.
PLAYING CARDS.
APPLICATION FILED MAR. 17, 1915.

1,204,834.

Patented Nov. 14, 1916.
4 SHEETS—SHEET 3.

Witnesses:

Inventor:
Frank E. Williams.
By
Attorney

F. E. WILLIAMS.
PLAYING CARDS.
APPLICATION FILED MAR. 17, 1915.

1,204,834.

Patented Nov. 14, 1916.
4 SHEETS—SHEET 4.

Witnesses:

Inventor:
Frank E. Williams
Attorney

UNITED STATES PATENT OFFICE.

FRANK EDWIN WILLIAMS, OF SOUTH PASADENA, CALIFORNIA.

PLAYING-CARDS.

1,204,834.

Specification of Letters Patent.

Patented Nov. 14, 1916.

Application filed March 17, 1915. Serial No. 14,925.

*To all whom it may concern:*

Be it known that I, FRANK E. WILLIAMS, a citizen of the United States, residing at South Pasadena, in the county of Los Angeles and State of California, have invented new and Improved Playing-Cards, of which the following is a specification.

This invention relates to playing cards and has for its primary object the provision of a pack, set or deck of playing cards by means of which a variety of games either of chance or skill may be played.

The invention consists in the provision of a set, pack or deck of cards divided into suits or series, the cards of each suit or series having progressive or sequential relation to each other and each series or suit having its common indication or suit designation mark or marks to differentiate the cards of such suit from the cards of other suits, and a special series or suit of cards common to each and all of the other series of cards and preferably provided with the indication marks of each and all of the other suits.

There may be many different embodiments of my invention and for the purpose of illustration I have shown in the accompanying drawings a pack, set or deck of cards consisting of fifty-three cards in number, divided into a plurality of independent suits, a special series or suit of cards common to each and all of the independent suits, and an arbitrary card or "joker."

Figure 1:
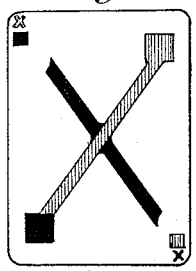
Figure 2:
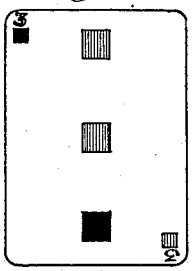
Figure 3:
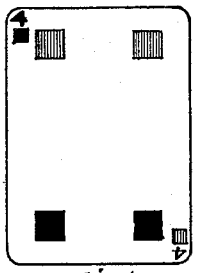
Figure 4:
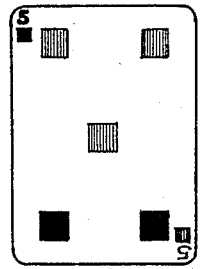
Figure 5:
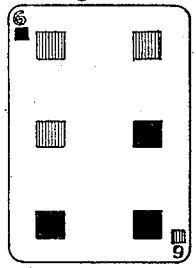
Figure 6:
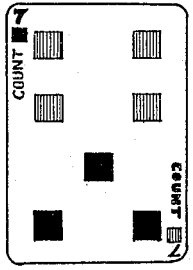
Figure 7:
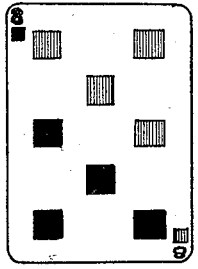
Figure 8:
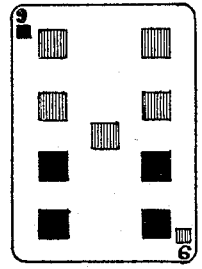

In the drawings: Figures 1 to 8 illustrate one of the independent suits. In the particular embodiment shown the indication marks of this suit are square in form, and the suit may therefore take the name of "squares." From Figs. 1 to 8 it is obvious that the cards of this suit bear indication marks in the form of squares denoting their sequential relation or value with respect to each other. Fig. 1 shows what may be the lowest card or first card of such suit and contains thereon two squares. This card, however, is illustrated as having a special indication in the form of an X, one leg of the X at its respective ends being provided with squares as indicating marks, so that the card represented in Fig. 1 may be used in the sequence or series of this suit as the card next to the card of Fig. 2 containing three indication marks, or what might be termed a three-spot, or this card of Fig. 1 may be used as an X card or ten-spot card having its sequential relation or series relation next to the card of Fig. 9, or the ten-spot card. This provision of this X card gives a variety of values and a variety of changes to the cards of this series and the card of Fig. 1 is referred to herein as the X card.

Figure 9:
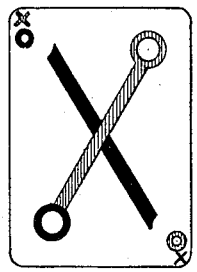
Figure 10:
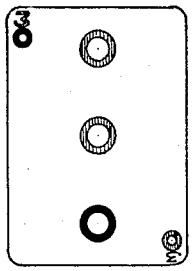
Figure 11:
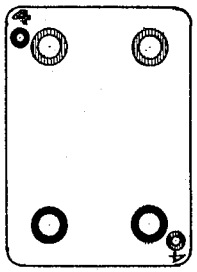
Figure 12:
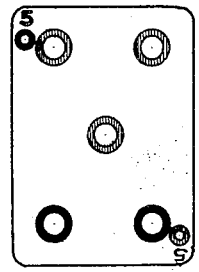
Figure 13:
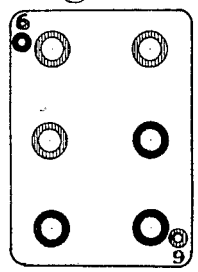
Figure 14:
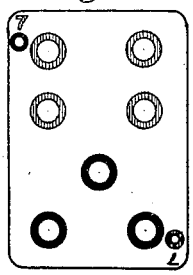
Figure 15:
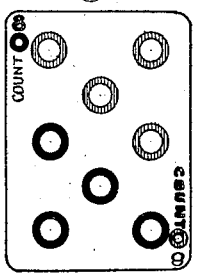
Figure 16:
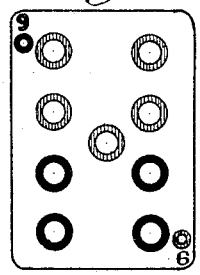

Figs. 9 to 16 illustrate another of the independent suits, the indication marks in this suit or series being shown in the particular embodiment illustrated in the drawings as "circles." The card of Fig. 9 is provided with two circles and also in the form of an X corresponding in this respect to Fig. 1, and each of the cards of Figs. 10 to 16 are provided with a numerically increasing or progressive number of circle indication marks so that their respective relations to or values in the series or suit are progressively indicated.

Figure 17:
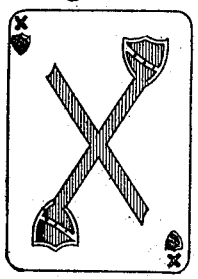
Figure 18:
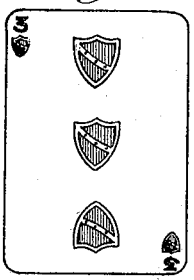
Figure 19:
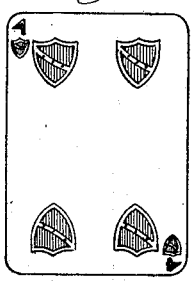
Figure 20:
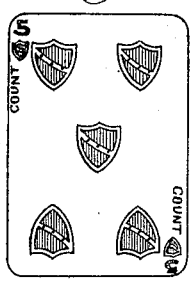
Figure 21:
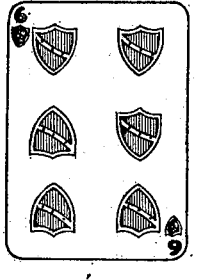
Figure 22:
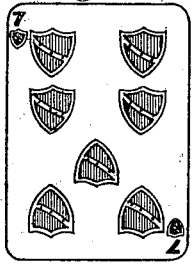
Figure 23:
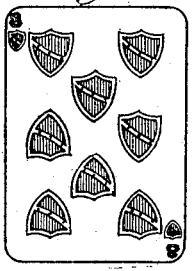
Figure 24:
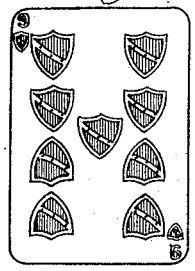

Figs. 17 to 24 illustrate another of the independent suits, the indication marks in this suit or series being shown in the particular embodiment illustrated in the drawings as "shields." The card of Fig. 17 is provided with two shields and the indicating marks are also in the form of an X corresponding in this respect to Fig. 1, and each of the cards of Figs. 17 to 24 are provided with a numerically increasing or progressive number of shield indication marks so that their respective relations to or values in the series or suit are progressively indicated.

Figure 25:
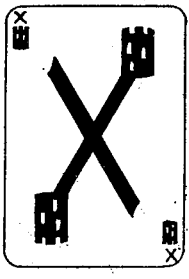
Figure 26:
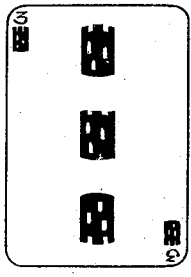
Figure 27:
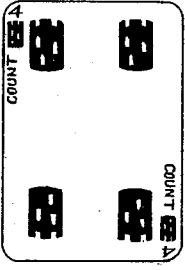
Figure 28:
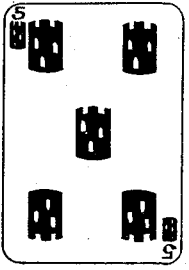
Figure 29:
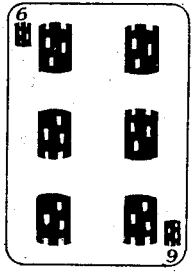
Figure 30:
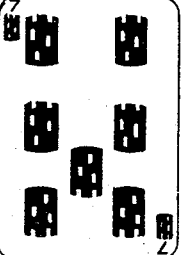
Figure 31:
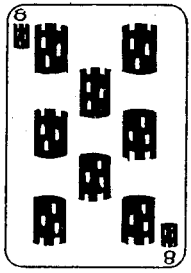
Figure 32:
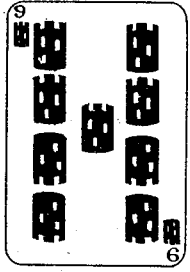

Figs. 25 to 32 illustrate another of the independent suits, the indication marks in this suit or series being shown in the particular embodiment illustrated in the drawings as "castles." The card of Fig. 25 is provided with two castles and the indicating marks are also in the form of an X corresponding in this respect to Fig. 1, and each of the cards of Figs. 25 to 32 are provided with a numerically increasing or progressive number of castle indication marks so that their respective relations to or values in the series or suit are progressively indicated.

Figure 33:
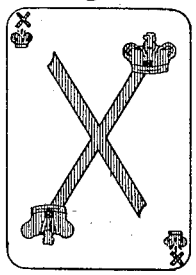
Figure 34:
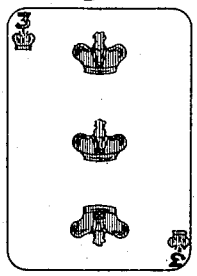
Figure 35:
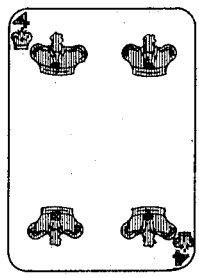
Figure 36:
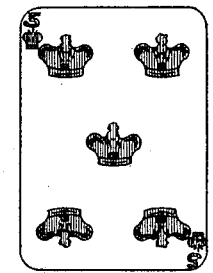
Figure 37:
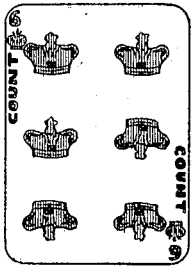
Figure 38:
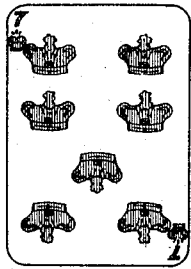
Figure 39:
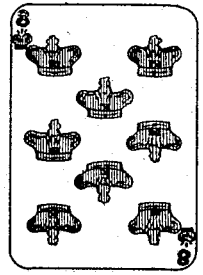
Figure 40:
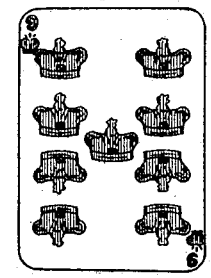

Figs. 33 to 40 illustrate another of the independent suits, the indication marks in this suit or series being shown in the particular embodiment illustrated in the drawings as "crowns." The card of Fig. 33 is provided with two crowns and the indicating marks are also in the form of an X corresponding in this respect to Fig. 1, and each of the cards of Figs. 33 to 40 are provided with a numerically increasing or progressive number of crown indication marks so that their respective relations to or values in the series or suit are progressively indicated.

Figure 41:
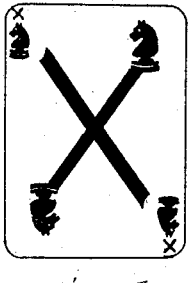
Figure 42:
Figure 43:
Figure 44:
Figure 45:
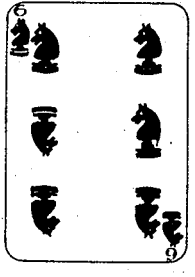
Figure 46:
Figure 47:
Figure 48:
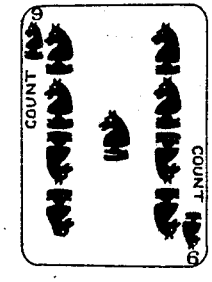

Figs. 41 to 48 illustrate another of the independent suits, the indication marks in this suit or series being shown in the particular embodiment illustrated in the drawings as "knights." The card of Fig. 41 is provided with two knights and the indicating marks are also in the form of an X corresponding in this respect to Fig. 1, and each of the cards of Figs. 41 to 48 are provided with a numerically increasing or progressive number of knight indication marks so that their respective relations to or values in the series or suit are progressively indicated.

Figure 49:
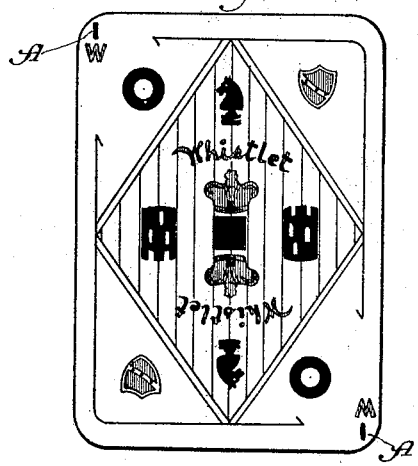
Figure 50:
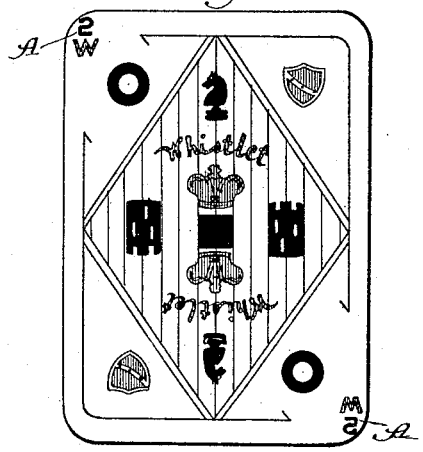
Figure 51:
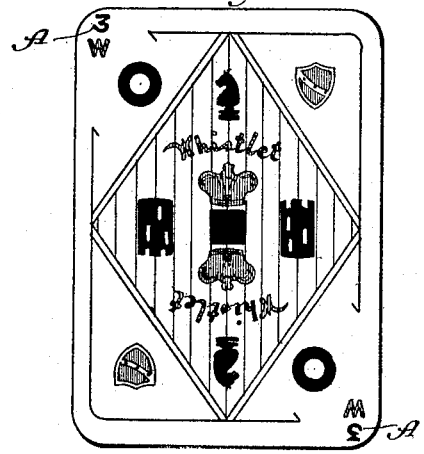
Figure 52:
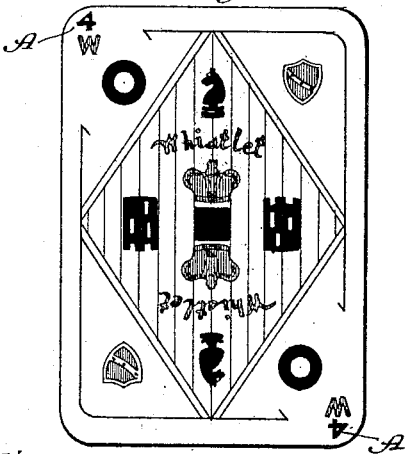

Figs. 49 to 52 illustrate an embodiment of the special series or suit of cards which is common to each and all of the independent suits. This common or special series of cards is provided with indication marks corresponding to each of the independent suits and is also provided with its own series or sequence indication marks. In Fig. 49 the card of this special suit is indicated at A as by the indication mark 1 as being the first card of this suit; at A in Fig. 50 as being the second card of this suit; at A in Fig. 51 as being the third card of this suit; at A in Fig. 52 as being the fourth card of this suit.

Figure 53:
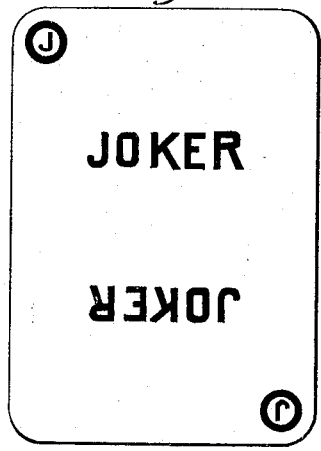

Fig. 53 illustrates an arbitrary card or joker which may or may not be provided with the pack or deck of cards.

While I have shown and illustrated in this particular embodiment of the invention a pack, set or deck of cards comprising six independent suits and one special series or suit of cards common to each and all of the independent suits, and have shown and illustrated each of the independent suits as comprised of a series of eight cards, it is obvious that the number of suits and the number of cards to a suit may be varied at will without departing from my invention.

For some games it may be desired to have some of the cards having special value as "count" cards in calculating the score or points of the game and for this purpose any one or more of the cards of a given series may be indicated as count cards. Examples of this are shown in Figs. 6, 15, 20, 27, 37 and 48, where a special indication such for instance as the letters "Count" is imprinted upon the card for this purpose.

If desired the special series of cards illustrated in Figs. 49 to 52 inclusive may be given an arbitrary name to designate or distinguish the same. This is indicated in said figures of the drawings by the word "Whistlet."

What I claim:

1. A set or pack of playing cards divided into a plurality of independent suits, the cards of each of such suits having suit designation marks and a plurality of designating marks indicating the series or sequential order or value of the cards of the suit, and a suit common to each of said first named suits, said common suit consisting of a plurality of cards having designating marks thereon indicating the sequential order or value of the cards in such suit.

2. A set or pack of playing cards comprising six independent series of suits of substantially equal number of cards having suit indication marks thereon and designating marks indicating the series or sequential value or relation of each of the cards of a suit to the other, and a seventh suit of cards common to each of the first named suits and having marks thereon designating the sequential order or value of the cards in such suit.

3. A set or pack of playing cards comprising fifty-two cards divided into six independent suits of eight cards each containing suit indications and indications of the relative sequence of the cards in the suit, and a seventh series of cards having indications of relative sequence to each other and indications corresponding to each of said six suits.

4. A set or pack of playing cards comprising fifty-two cards divided into six independent suits of substantially equal number of cards and having indication marks distinguishing the suit and indicating the sequence of the cards of the suit, and a seventh series of cards having marks indicating sequential relation to each other and common to all said six suits.

5. A set or pack of playing cards comprising a plurality of cards divided into a plurality of suits, the cards of each suit having a common suit designating mark and sequential designating marks, and a plurality of cards having sequential designating marks and common to all said suits, one of the cards of each suit having designating marks indicating sequential relation at either end of such suit.

In testimony whereof, I have hereunto set my hand at Los Angeles, California, this 11th day of March, 1915.

FRANK EDWIN WILLIAMS.

In presence of—
 FREDERICK S. LYON,
 LORA M. BOWERS.

Copies of this patent may be obtained for five cents each, by addressing the "Commissioner of Patents, Washington, D. C."